United States Patent [19]
German

[11] Patent Number: 5,722,711
[45] Date of Patent: Mar. 3, 1998

[54] GRIP ZONE BEDLINER

[76] Inventor: Mark K. German, 1740 Lexington Ave., Uniontown, Pa. 15401

[21] Appl. No.: 725,356

[22] Filed: Oct. 3, 1996

[51] Int. Cl.$^6$ .................................................. B60R 13/01
[52] U.S. Cl. .......................................... 296/39.2; 296/41
[58] Field of Search ................... 296/39.1, 39.2, 296/41

[56] References Cited

U.S. PATENT DOCUMENTS

| | | | |
|---|---|---|---|
| 3,578,375 | 5/1971 | Finefrock | 296/39 |
| 3,652,123 | 3/1972 | Speers | 296/28 D |
| 4,029,354 | 6/1977 | Valeri | 296/28 D |
| 4,188,058 | 2/1980 | Resa et al. | 296/39.2 X |
| 4,802,705 | 2/1989 | Elwell | 296/39.2 |
| 4,944,612 | 7/1990 | Abstetar et al. | 296/39.2 |
| 5,090,763 | 2/1992 | Kremer et al. | 296/39.1 |
| 5,131,709 | 7/1992 | Spica | 296/39.2 |
| 5,165,747 | 11/1992 | Stringer et al. | 296/41 |
| 5,370,436 | 12/1994 | Martindale et al. | 296/39.2 |
| 5,505,512 | 4/1996 | Martindale et al. | 296/39.2 |
| 5,549,428 | 8/1996 | Yeatts | 410/94 |
| 5,551,742 | 9/1996 | Martindale et al. | 296/39.2 |
| 5,597,194 | 1/1997 | Daugherty et al. | 296/39.2 |

FOREIGN PATENT DOCUMENTS 1 257 456   12/1971   United Kingdom ................... 296/314

OTHER PUBLICATIONS

Advertising literature of Benton Plastics, Inc., Bodygard, Clinton, TN entitled "When Your Truck Stops, Does Your Cargo?"(no date).

Primary Examiner—Joseph D. Pape
Attorney, Agent, or Firm—Price & Adams

[57] ABSTRACT

A bedliner for a vehicle cargo bed is formed of a non-grip polymeric material substantially covering the floor of the cargo bed. The material has a coefficient of friction suitable for allowing sliding movement of cargo placed on the bedliner. The bedliner is molded into longitudinally extending ribs and valleys to facilitate water drainage. Selectively positioned grip zones are formed on the bedliner by releasably engageable friction strips having a coefficient of friction higher than the coefficient of friction of the polymeric material to restrain undesired sliding movement of the cargo on the bedliner. The grip zones are preferably located in an area adjacent to the corners of the bedliner floor to allow cargo to be easily moved onto the bedliner and then shifted to the grip zones. Once the cargo is positioned on the grip zones, the friction strips restrain sliding movement of the cargo when the vehicle is in motion.

25 Claims, 8 Drawing Sheets

GRIP ZONE BEDLINER

BACKGROUND OF THE INVENTION

1. Field of the Invention

This invention relates to bedliners for vehicles having cargo beds, and, more particularly, to protective bedliners having designated grip and non-grip zones to facilitate movement and retention of articles placed in the cargo bed.

2. Description of the Prior Art

In recent years, the popularity of pickup trucks, sport utility vehicles, and other vehicles having cargo beds has expanded. As a result there has been an increased emphasis placed upon the vehicle's appearance and integrity. During use, the cargo beds of these vehicles are susceptible to countless dents and scratches which detract from the appearance and overall value of the vehicle and in many instances lead to damaging rust which can further reduce the vehicle's value. To counteract these effects, bedliners are often installed to protect the vehicle's cargo bed from damage. Most of these liners are formed in substantially the same fashion, consisting of a polymer type material custom made to fit the specifications of each vehicle. Conventionally, a liner protects the walls and the floor of the cargo bed with a unitary sheet of material molded to integrally form each surface.

One principal problem with the standard construction is that the plastic materials typically used in constructing bedliners have a relatively low coefficient of friction. This is desirable when loading and unloading cargo; however, during transit the cargo has a tendency to uncontrollably slide on the bed resulting in damage to the cargo as well as the cargo bed. Several prior art bedliners have attempted to solve this problem by restricting the area in which cargo may move. U.S. Pat. No. 5,090,763 discloses a cargo bedliner with a restraint system. The restraint system includes molding restraint support members into the floor of the liner. The support members are constructed to allow insertion of 2"×4"'s and like restraining members into fastened engagement with the liner thereby partitioning the cargo bed.

U.S. Pat. No. 5,131,709 teaches a bedliner formed of a plurality of grid-like modules. These modules are constructed to interconnect and completely encase the cargo bed. One embodiment includes the use of hinge means to allow portions of the liner to be moved thereby creating partitions. A second embodiment allows the insertion of outside objects, such as tool boxes, into apertures in the modules thereby fixing those objects in place.

A problem inherent with the known bedliner systems is their inability to be utilized quickly and easily. Both of the above-mentioned systems require moving pieces of the liner or adding additional outside pieces to the liner to effect restraint.

Other prior art attempts to solve the problem of the impact resistance/cargo slippage include constructing the floor of the liner with rubber-like materials. These materials have higher coefficients of friction than the plastic materials customarily used thereby reducing cargo slippage. U.S. Pat. No. 3,652,123 (the '123 patent) discloses a bedliner having a floor section fabricated of a rubber material designed to reduce the tendency for cargo to slide upon transit. The floor consists of planks of rubber bonded to a metal plates which can be secured to the cargo bed of the vehicle. U.S. Pat. No. 5,370,436 (the '436 patent) also teaches the use of rubber materials on the floor of the liner to reduce the likelihood of cargo slippage. However, unlike the '123 patent, the '436 patent discloses raised rubber pads which allow water to drain from the bed underneath any cargo situated thereon.

While the known prior art system reduces the tendency of cargo to slip on a truck bed, the systems provide the truck bed with a high friction coefficient which impedes movement of cargo on the bed and thereby makes it difficult to move the cargo to a selected position on the bed.

Therefore, there is a need for a protective bedliner having areas or zones that facilitate ease of movement of cargo onto the bedliner and then once in a desired position the cargo is restrained from slipping when the vehicle is in motion. Furthermore, the loading and unloading must be easily and quickly accomplished without the need to add or remove additional restraints.

SUMMARY OF THE INVENTION

In accordance with the present invention, there is provided a bedliner for a vehicle cargo bed having a front wall, a back wall, right and left sides, and a bottom surface. A non-grip floor fabricated of a polymeric material substantially covers the bottom of the cargo bed. The polymeric material has a coefficient of friction suitable for allowing articles placed on the bedliner to be easily moved. The floor has right and left edges, a front edge and a back end forming four corners located along the floor and right edges adjacent to front and back ends. A plurality of friction strips having a coefficient of friction higher than the coefficient of friction of the polymeric material are provided for frictionally restraining articles placed on the strips. The friction strips are secured to the floor in preselected positions to form a plurality of grip zones. The grip zones are located on the floor to facilitate movement and retention of cargo placed on the floor.

Further in accordance with the present invention there is provided a bedliner for vehicle cargo bed having a front wall, a tailgate, right and left sides, and a bottom surface. A non-grip floor is fabricated of material substantially covering the bottom of the cargo bed. The material is of a slippery nature so that articles placed thereon are easily moved. The floor has left and right edges, and front and back edges. A bedliner front wall is fabricated of material substantially covering the front wall of the cargo bed. The bedliner front wall is positioned above the surface of the floor. Bedliner right and left side walls are fabricated material substantially covering the right and left sides of the vehicle cargo bed. The bedliner right and left side walls are positioned above the floor right and left edges. A plurality of friction strips are provided having a coefficient of friction higher than the coefficient of friction of the bedliner material. The friction strips restrain movement of articles placed on the strips. The strips are positioned on the floor in preselected positions to form a plurality of grip zones. The grip zones are located on the floor to facilitate movement and retention of cargo placed on the floor. Attachment means releasably connect the friction strips to the floor.

Further in accordance with the present invention, there is provided a method for loading cargo onto a bedliner having at least four corners including the steps of positioning the cargo on a bedliner floor having a coefficient of friction permitting articles placed on the floor to move easily. The cargo is slid along the floor to an area adjacent a desired location on the floor. A grip zone is positioned at the desired location on the floor. The grip zone has a coefficient of friction greater than the coefficient of friction of the remainder of the floor and capable of restraining articles placed thereon from moving freely. The cargo positioned on the bedliner floor is moved onto the grip zone to restrain undesired movement of the cargo on the bedliner floor.

The present invention is also directed to a bedliner for a vehicle cargo bed having a front wall, a tailgate, right and left sides, and a bottom surface. A floor fabricated of polymeric material substantially covers the bottom surface of the cargo bed. The polymeric material has a coefficient of friction permitting articles placed on the floor to move easily. The floor is molded to form a plurality of longitudinally extending parallel spaced ribs. Each of the ribs has an upper surface. A plurality of longitudinally extending valleys are formed between the ribs. The ribs and valleys are positioned to promote drainage of water from the floor. A plurality of selected adjacent ribs are positioned at a preselected location on the floor where sliding movement of cargo on the floor is desired to be restrained. The selected adjacent ribs have slots cut in the upper surfaces. A plurality of friction strips are releasably engaged in the slots of the selected adjacent ribs. The friction strips have a coefficient of friction higher than the coefficient of friction of the polymeric material forming the floor. The friction strips each have a bottom edge portion releasably engageable in the slots to position the friction strips on the upper surfaces of the selected adjacent ribs. A plurality of non-grip strips are releasably inserted into the slots of the selected adjacent ribs. The non-grip strips have a coefficient of friction substantially identical to the coefficient of friction of the polymeric material forming the floor to facilitate sliding movement of cargo on the selected adjacent ribs. The non-grip strips replace the friction strips on the selected adjacent ribs when unrestrained sliding movement of the cargo on the selected adjacent ribs is desired.

Accordingly, a principal object of the present invention is to provide method and apparatus for facilitating movement and restraint of cargo placed on a protective floor liner in a cargo bed of a vehicle.

Another object of the present invention is to provide a vehicle bedliner floor section with friction strips in designated grip zones to restrain undesired movement of cargo loaded on the floor section.

Another object of the present invention is to provide a vehicle bedliner tailgate section having grip and non-grip surfaces which facilitate easy movement and retention of cargo placed thereon.

Another object of the present invention is to provide a vehicle bedliner with a plurality of slots wherein grip and non-grip strips are positioned to facilitate variable cargo loading and restraining configurations.

These and other objects of the present invention will be more completely disclosed and described in the following specification, accompanying drawings, and appended claims.

DESCRIPTION OF THE PREFERRED EMBODIMENTS

Figure 1:
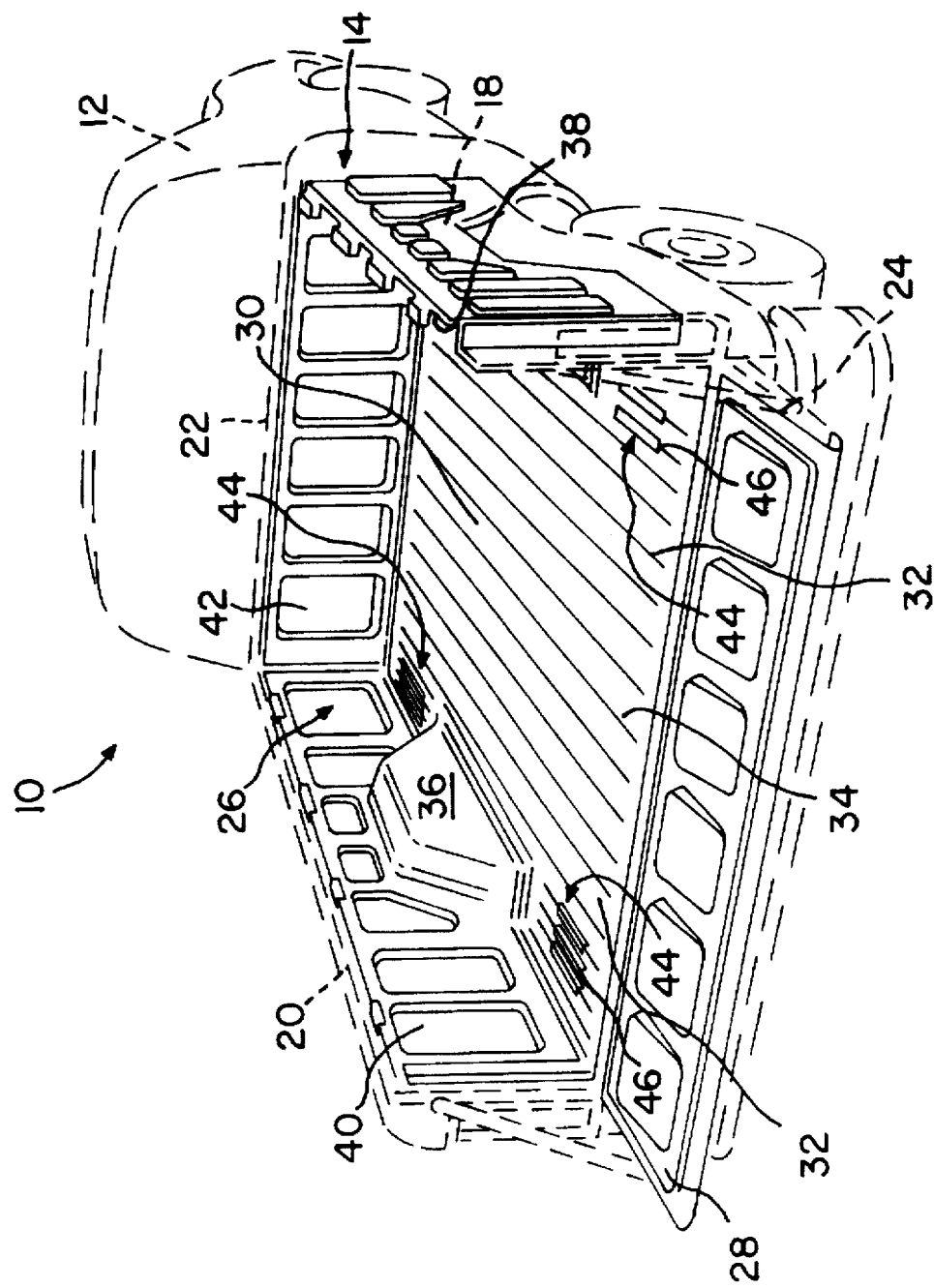
FIG. 1 is an isometric view of a grip zone bedliner positioned on a truck bed shown in phantom, illustrating grip zones and non-grip zones of the bedliner floor for cargo restraint and loading.

Referring to the drawings and particularly to FIG. 1, there is illustrated a conventional pickup truck generally designated by the number 10 having an operator's cab 12 and a cargo bed generally designated by the numeral 14. The cargo bed 14 includes a flat bed surface (not shown) and oppositely positioned right and left sides 18 and 20 extending vertically from the bed surface in spaced parallel relationship. The cargo bed 14 also includes a front wall 22 extending vertically from the bed surface in perpendicular relationship to the side walls 18 and 20. A tailgate 24 extends from the back of the cargo bed 14 and can be pivoted from horizontal alignment with the cargo bed 14 (as shown) to vertical alignment perpendicular to sides 18 and 20.

To protect the cargo bed 14 from damage, a protective bedliner generally designated by the numeral 26 is positioned in the cargo bed 14 to cover front wall 22, bottom surface, and side walls 18 and 20. The bedliner 26 is typically formed of high density polyethylene in an integral molded unit. The polyethylene has a coefficient of friction suitable for allowing articles to be easily moved by sliding on the bedliner 26. A tailgate liner 28 is positioned on the tailgate 24 to protect it from damage.

The bedliner 26 includes a non-grip floor 30 adapted to fit on and substantially cover the full length and width of the cargo bed surface. In a conventional manner the bedliner 26 is molded of polymeric material to form a corrugated pattern of spaced apart, longitudinally extending, parallel ribs and valleys 32 and 34 to facilitate drainage of water from the floor 30. A pair of wheel wells 36 extend upwardly from the liner floor 30 and are adapted to cover the cargo bed rear wheel wells (not shown).

Right and left side walls 38 and 40 and a front wall 42 are integrally formed with the liner floor 30 and wheel wells 36. With this arrangement, the bedliner 26 is complementary with the cargo bed 14 at the bedliner front wall 42, side walls 16 and 18, and floor 30 to completely cover and protect the surfaces of the cargo bed 14.

Bedliner floor 30 and tailgate liner 28 include a plurality of grip zones generally designated by the numeral 44 selectively positioned on the bedliner floor 30. Each grip zone 44 is formed by a plurality of friction strips 46. Friction strips 46 are constructed of material having a higher coefficient of friction than the coefficient of friction of the line material. Without the friction strips 46 positioned on the bedliner floor 30, cargo positioned on the floor 30 slides freely unless it is suitably tied down. The friction strips 46 are utilized to restrain undesired sliding movement of cargo on the bedliner floor 30. Thus, the friction strips 46 are selectively positioned in zones or areas of the floor 30. The proximity of friction strips 46 to each other enhances the overall cargo restraining ability of each grip zone 44.

Figure 2:
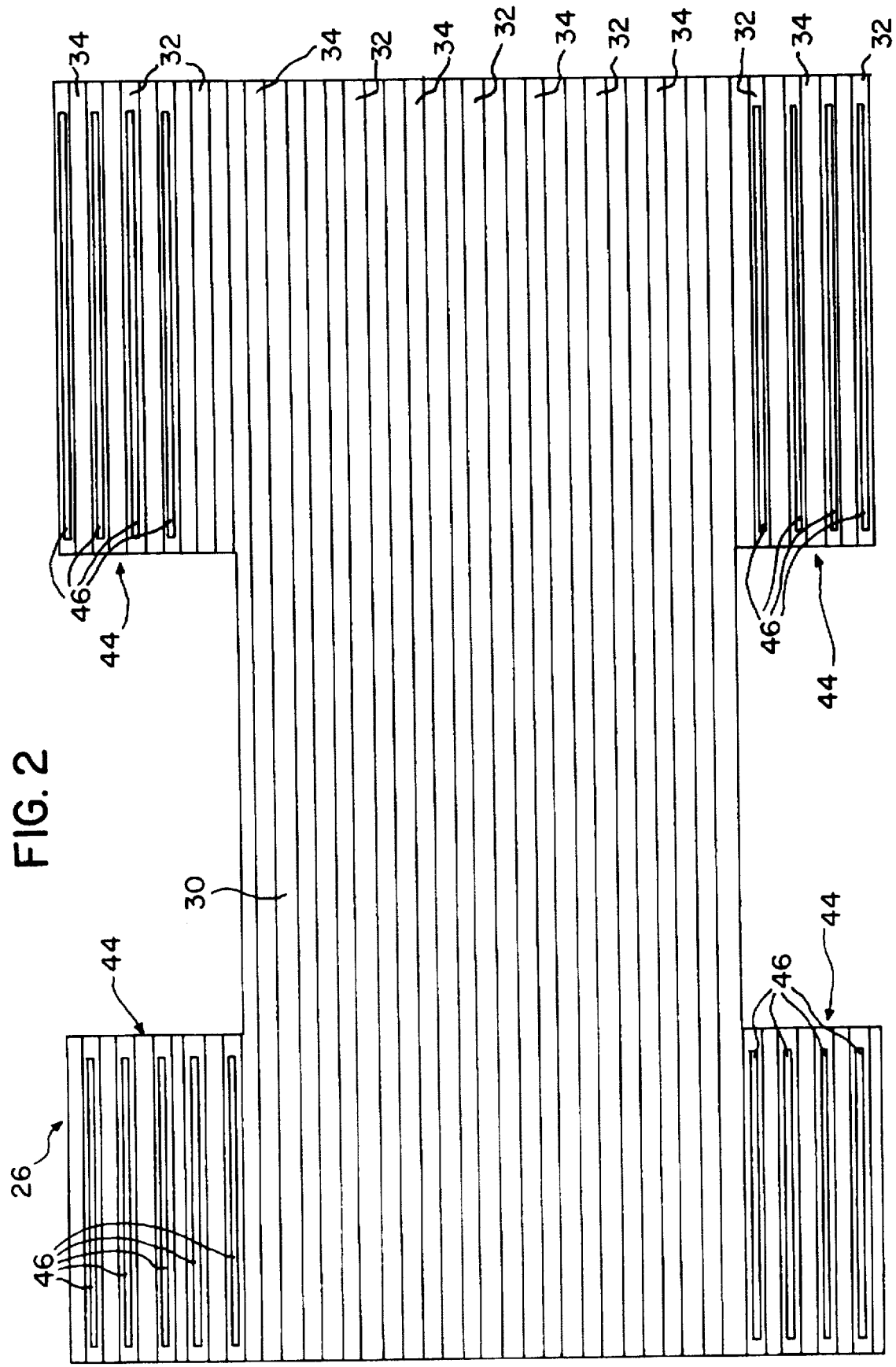
FIG. 2 is a top plan view of the grip zone bedliner shown in FIG. 1, illustrating the grip zones at the four corners of the bedliner.
Figure 3:
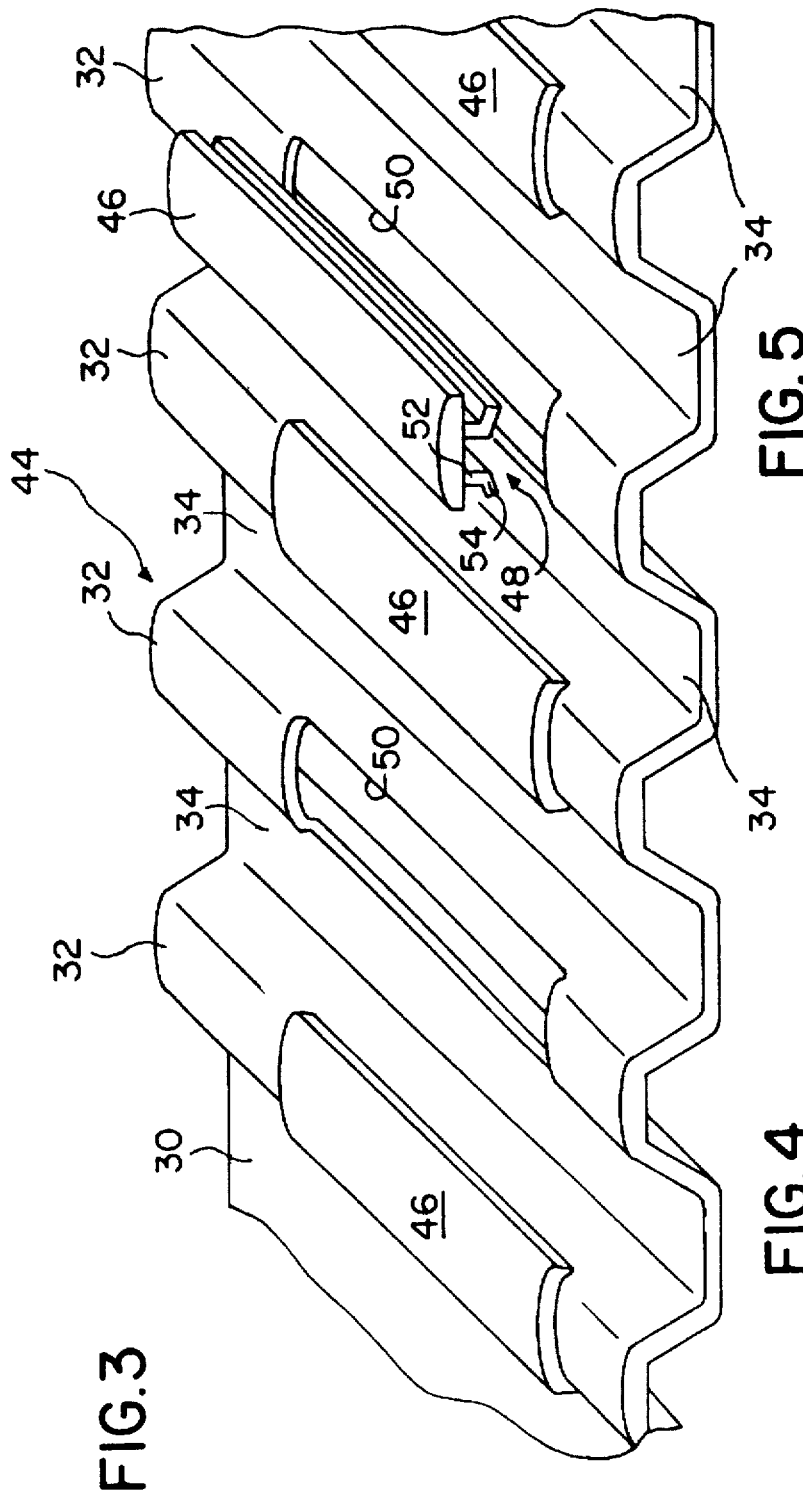
FIG. 3 is a fragmentary, exploded isometric view of a floor section of the bedliner located in a grip zone, illustrating the attachment of friction strips to the floor section.
Figure 5:
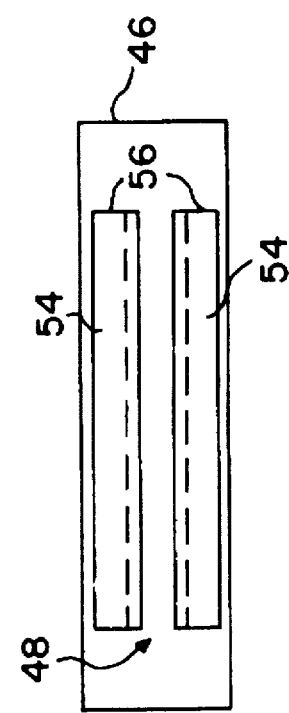
FIG. 5 is a bottom plan view of the friction strip shown in FIG. 4.
Figure 4:
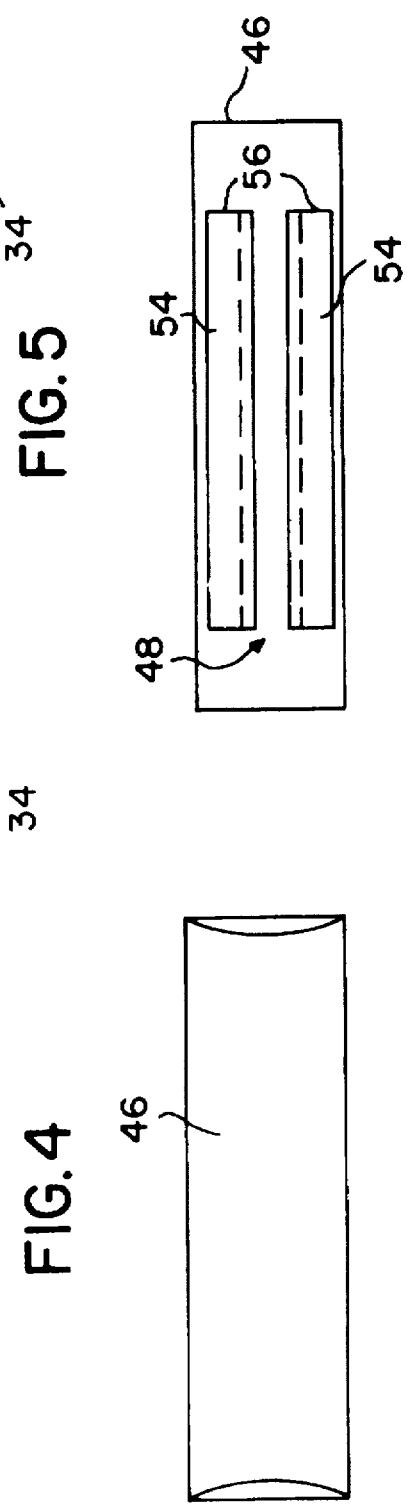
FIG. 4 is a top plan view of the friction strip shown in FIG. 3.
Figure 7:
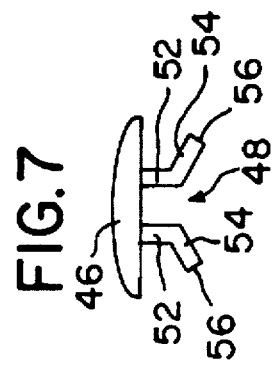
FIG. 7 is a front elevational view of the friction strip shown in FIG. 4.
Figure 6:
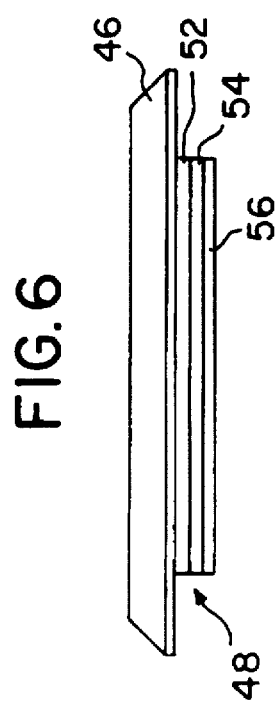
FIG. 6 is a side elevational view of the friction strip shown in FIG. 4.

As illustrated in FIGS. 1 and 2, grip zones 44 are preferably located at or adjacent the corners of bedliner floor 30, immediately behind and in front of wheel wells 36. Also, grip zones are preferably located on opposing ends of tailgate cover 28. The placement of the grip zones is selected to facilitate easy loading of cargo onto the liner floor 30. After loading, the cargo is moved by sliding onto grip zones 44 conveniently positioned to restrain movement of the articles during transit.

As illustrated in FIGS. 3–7, the friction strips 46 are preferably formed of a resilient material such as rubber and are releasably connected to the tops of ribs 32 in the grip zones 44. In one embodiment each strip 46 includes opposing L-shaped protrusions 48 extending from the bottom of the strip 46. The protrusions 48 are inserted through rectangular slots 50 cut into the top surface of the ribs 32. The L-shaped protrusions 48 have upper portions 52 and lower portions 54.

The lower portions 54 have free ends 56 which extend away from each other. The distance between the free ends 56 is greater than the width of slot 50 but less than the width of rib 32. The outside distance between upper portions 52 is slightly less than the width of slot 50. Also, the length of each upper portion 52 is approximately equal to the thickness of bedliner 26. Upon insertion, the lower portions 54 are compressed together to allow passage through slot 50. Once inserted, the lower portions 54 spring back to their initial uncompressed shape, thereby securely retaining friction strip 46 in slot 50. Due to the resilient nature of friction strips 46 and L-shaped protrusions 48, the friction strips are easily removable by simply pulling on an edge of friction strip 46, thereby deforming lower portion 54 and effecting removal.

Figure 8:
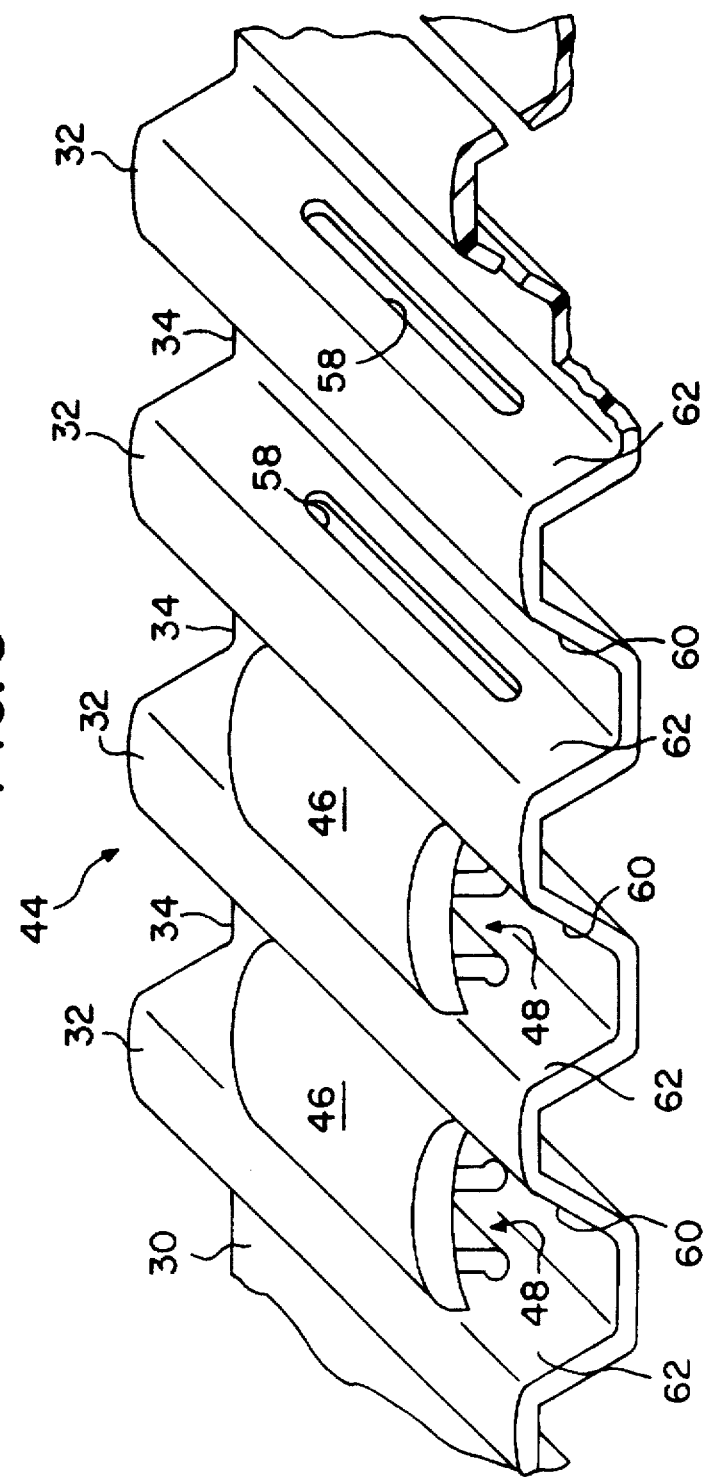
FIG. 8 is a fragmentary isometric view similar to FIG. 3 of another embodiment of a grip zone.

Referring to FIG. 8, there is illustrated another embodiment of friction strips 46 formed of a resilient material and mounted in the valleys 34 between ribs 32 in the grip zone 44 by opposing L-shaped protrusions 48 extending from the bottom of each friction strip 46. The protrusions 48 are inserted through rectangular slots 58 cut into the right and left sides 60 and 62 of valleys 34. In this embodiment, slots 58 are approximately the same width as lower portions 54. The distance between slots 58 is slightly less than the outside distance between strip upper portions 52 so as to provide spring tension on L-shaped protrusions 48 after insertion into slots 58. The distance between the top of strip lower portion 54 and the top of friction strip 46 is greater than the distance between slots 58 and the top of rib 32. With this arrangement the top surfaces of friction strips 46 project above the top of ribs 32 after insertion. Due to the resilient nature of friction strips 46 and L-shaped protrusions 48, friction strips 46 are easily removable by simply pulling on an edge of friction strip 46, thereby deforming lower portion 54 and effecting removal.

Figure 9:
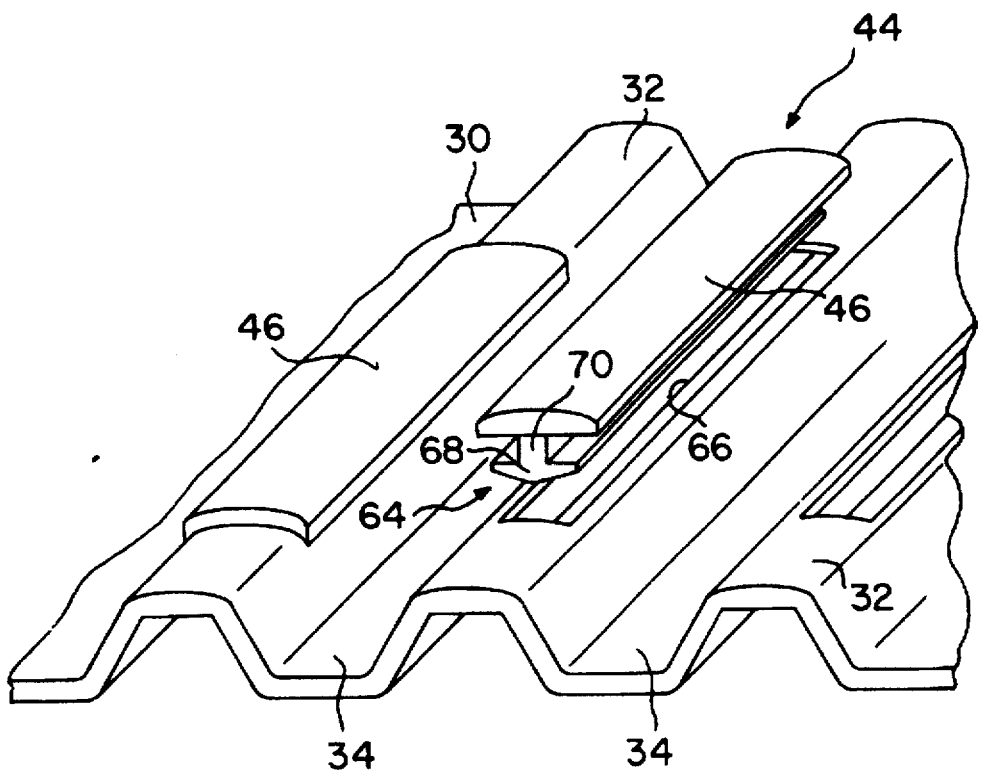
FIG. 9 is a fragmentary isometric view similar to FIG. 3 of a further embodiment of a grip zone.
Figure 10:
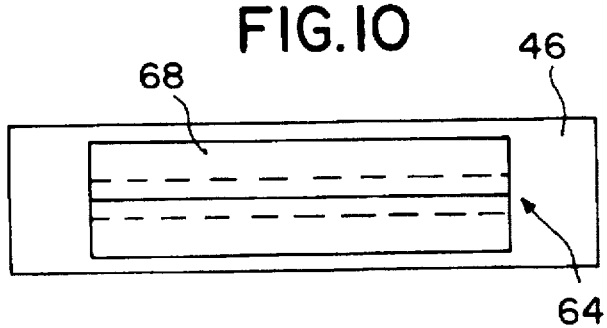
FIG. 10 is a bottom plan view of the friction strip shown in FIG. 9.
Figure 11:
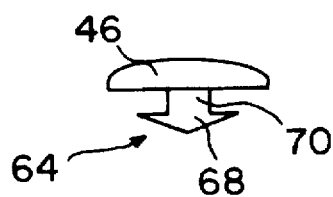
FIG. 11 is a front elevational view of the friction strip shown in FIG. 9.

Referring to FIGS. 9–11, there is illustrated a further embodiment of the present invention in which friction strips 46 are formed of a resilient material and mounted on top surfaces of the ribs 32 in grip zone 44 by arrow-shaped protrusions 64 pointed away and extending from the bottom of friction strips 46. The protrusions 64 are releasably inserted in the rectangular slots 66 cut into the top surfaces of ribs 32. In this embodiment, each protrusion 64 has an arrowhead portion 68 and a shaft portion 70. Arrowhead portion 68 is slightly wider than shaft portion 70. Likewise, slot 66 is approximately the same width as shaft portion 70. Shaft portion 70 is slightly longer than the thickness of the material forming bedliner 26. Upon insertion, the arrowhead portion 68 is compressed to allow passage through slot 66. Once inserted, the arrowhead portion 68 returns to its initial uncompressed shape thereby retaining friction strip 46 in slot 66. Due to the resilient nature of friction strips 46 including the arrow-shaped protrusion 64, the friction strips 46 are easily removable by simply pulling on an edge of friction strip 46 thereby deforming arrowhead portion 68 and effecting removal.

Figure 12:
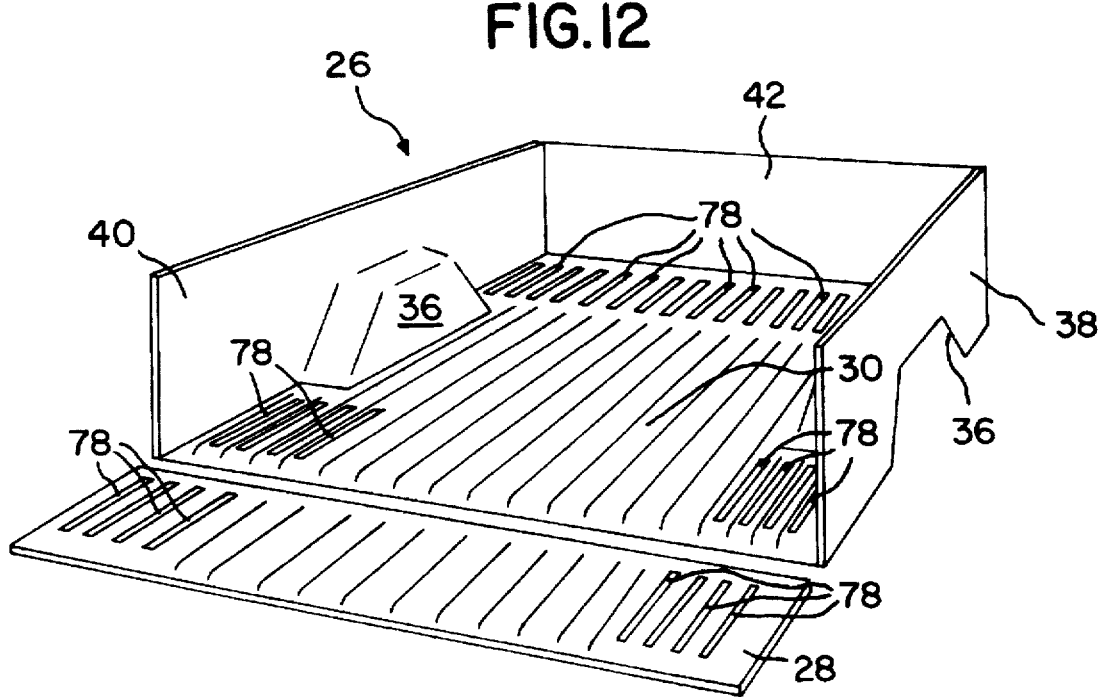
FIG. 12 is an isometric view of the grip zone bedliner on a truck bed, illustrating friction strips selectively positioned on the truck tailgate.
Figure 13:
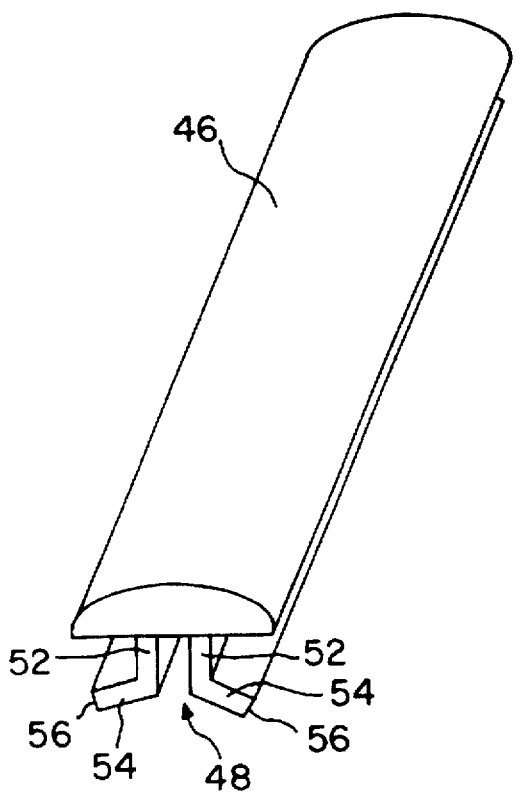
FIG. 13 is an isometric view of a high friction strip for insertion on the bedliner.
Figure 14:
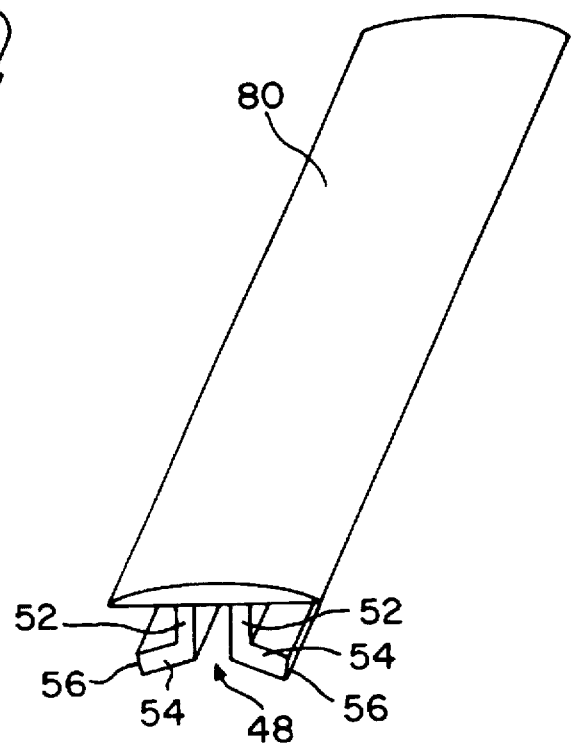
FIG. 14 is an isometric view of a low friction strip for insertion on the bedliner.

Now referring to FIG. 12, there is illustrated the bedliner floor 30 and tailgate cover 28 provided with a plurality of rectangular slots 78 cut into the tops of ribs 32 for both the floor 30 and tailgate cover 28. Slots 78 are located in selected areas such as the bedliner corners and on the lateral portions of the tailgate, where frictional retention of cargo is forseeably desired. With this arrangement bedliner users are offered a number of slots 78 which can be utilized for receiving removable strips.

Figure 15:
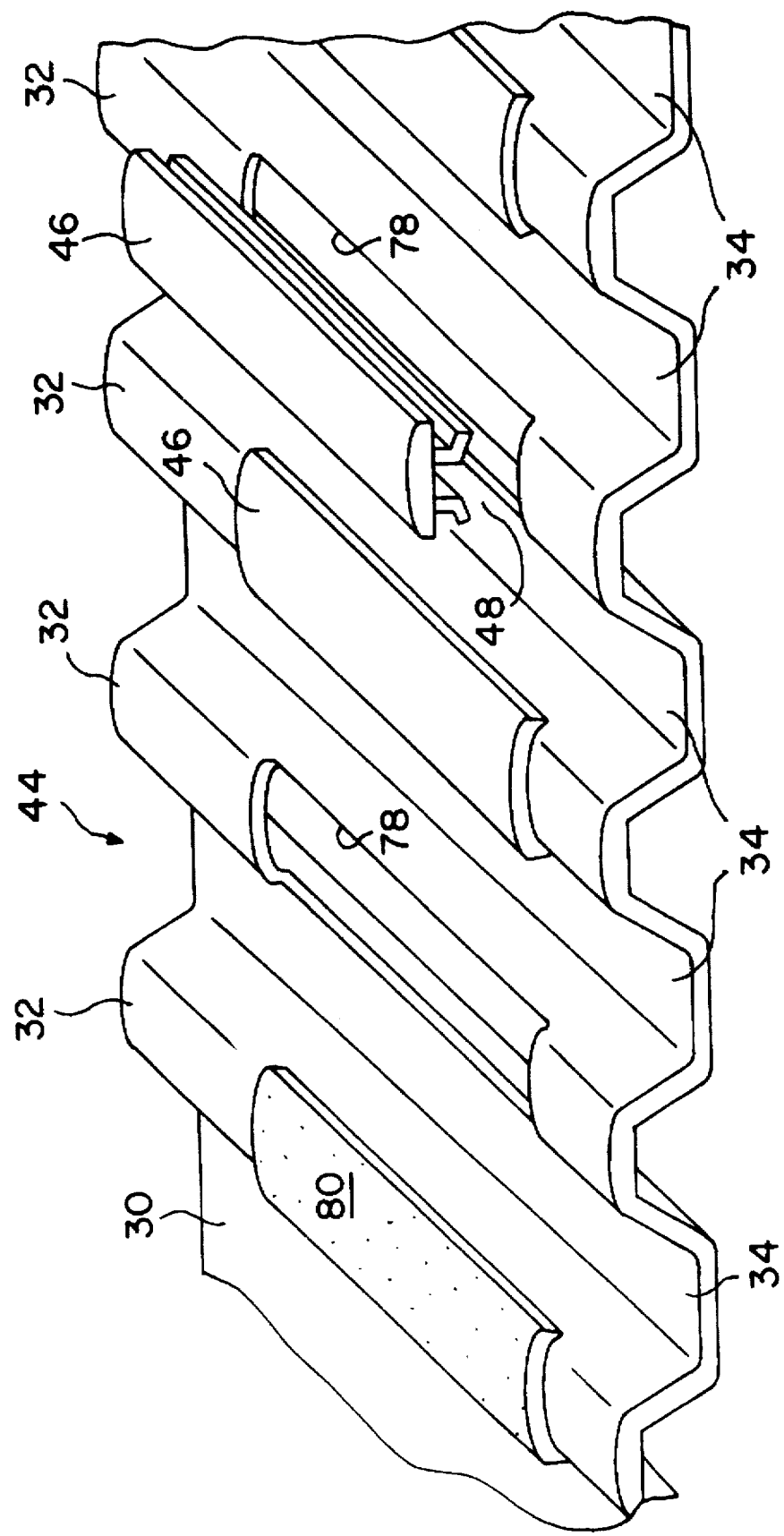
FIG. 15 is a fragmenting, exploded isometric view of a floor section of the bedliner, illustrating high and low friction strips retained in slots of the floor section.

Referring to FIG. 15, there is illustrated friction strips 46 having the deformable L-shaped protrusions 48, as disclosed above, mounted on the bedliner floor 30. The bedliner floor 30 also includes non-grip strips 80 generally constructed as friction strips 46; however, the non-grip strips 80 are formed of a polyethylene material similar to that which makes up bedliner 26. The non-grip strips 80 have a coefficient of friction similar to that of bedliner 26 so as not to frictionally impede movement of cargo placed thereon. The relative positioning of friction strips 46 and non-grip strips 80 into pre-existing slots 78 of the bedliner 26 shown in FIG. 12 is selective upon the user's needs in loading and hauling cargo on the bedliner 26.

With the provision of the non-grip strips 80, areas of the bedliner 26 shown in FIG. 12 having the slots 78 are provided with a slippery surface when it is not desired to restrain sliding movement of cargo on a particular section of the bedliner floor. This allows the bedliner user to alter the pattern of grip zones and non-grip zones on the areas of the bedliner floor 30 where slots are provided.

A selected pattern of the two types of zones can be constructed to meet the cargo loading and hauling requirements. For example, if a number of items of cargo are being hauled, it may be desirable to construct non-grip zones at all four corners of the bedliner 26 and none on the tailgate 24. In another application involving a large article of cargo it may be necessary to maximize the non-grip areas of the bedliner with only a single grip zone in one corner of the bedliner. The surface of the remaining corners of the bedliner must remain slippery to permit the cargo to be easily moved into position on the bedliner. Then, once loaded onto the bedliner the cargo is moved to a position engaging a grip zone to restrain undesired movement of the cargo when the vehicle is in transit. Thus, by selectively positioning the friction strips 46 and non-grip strips 80 in the slots 78 a selected pattern of grip zones and non-grip zones is constructed by the user on the bedliner 26.

Selective use of friction strips 46 and non-grip strips 80 is also provided on the tailgate liner 28 when provided with slots 78. In one application on loading cargo onto the bedliner 26, the non-grip strips 80 are positioned in the tailgate slots 78 to facilitate ease of sliding the cargo from the tailgate liner 28 onto the bedliner floor 30. After the cargo is loaded and it is necessary to maintain the tailgate 24 in a horizontal position, the non-grip strips 80 are replaced by friction strips 46 on the tailgate 24. This serves to restrain sliding movement of cargo on the tailgate 24 maintained in a horizontal position when the vehicle is in transit.

Figure 17:
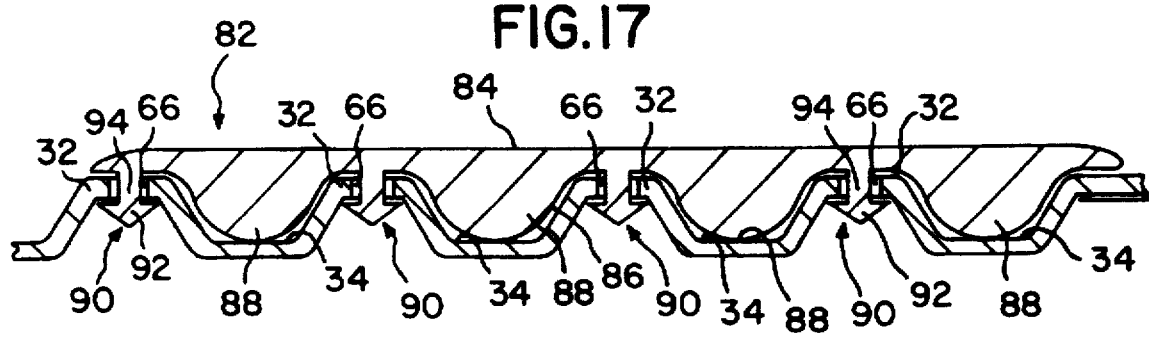
FIG. 17 is a fragmentary sectional view in side elevation taken along line XVII—XVII in FIG. 16, illustrating a friction pad releasably connected in slots of the bedliner floor section.
Figure 16:
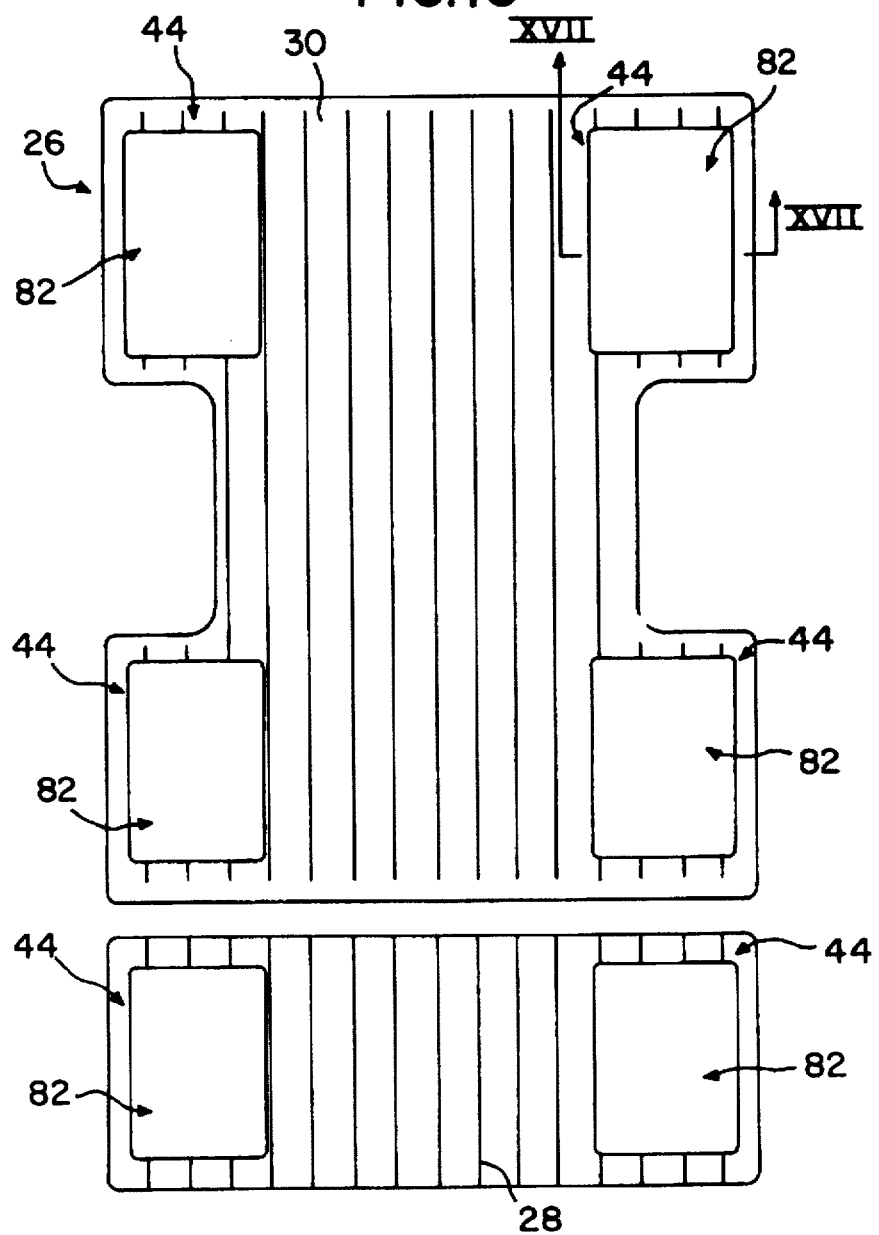
FIG. 16 is a top plan view of a bedliner floor section and tailgate section, illustrating friction pads mounted on the floor and tailgate sections for restraining undesired sliding movement of cargo thereon.

Now referring to FIGS. 16 and 17 there is illustrated an embodiment of the present invention that includes a plurality of friction pads generally designated by the numeral 82 releasably engageable with the slots 78 provided in the bedliner floor 30 and the tailgate line 28. The friction pads 82 provide a large unitary grip surface at designated zones of the bedliner as an alternative to using a plurality of friction strips 46 in a grip zone. For example, it may require the use of four or more friction strips 46 to form a grip zone in one corner of the bedliner 26, as shown in FIG. 2. A single friction pad 82 forms a grip zone of an equivalent area formed by the four friction strips 46.

As seen in FIGS. 16 and 17 the friction pads 82 are also fabricated of a resilient material having a coefficient of friction greater than the coefficient of friction of the polyethylene material forming the bedliner 26. Thus, only a single friction pad 82 is required to form an entire grip zone at each corner of the bedliner 26. Also, the friction pad 82 is constructed in any desired configuration or size to meet the requirements of the grip zone.

The friction pad 82 shown in FIG. 17 includes a continuous, planar upper surface 84 that spans four pairs of ribs 32 and valleys 34. A lower surfaces 86 has a corrugated configuration formed by ridges 88 that mesh with the corrugated surface of the bedliner 26 formed by the ribs 32 and valleys 34. Ridges 88 project from the pad lower surface 86 into the valleys 34. Between the pad ridges 88 are positioned arrow-shaped protrusions 90 which extend into the bedliner slots 78. The arrow-shaped protrusions 90 correspond to the arrow-shaped protrusion on the friction strips 46 described above and illustrated in FIGS. 9-11.

The protrusions 90 for the pads 82 also include a deformable arrowhead portion 92 and a shaft portion 94. With this arrangement as also described above, the arrowhead portion 92 is compressed to allow passage through the slot 78. Once inserted the arrowhead portion 92 returns to its initial uncompressed shape to secure the pads 82 in position on the bedliner floor 30. However, the arrowhead portion 92 is also easily deformed to permit its removal from the slot 78. In this manner the friction pads 82 are releasably engageable with the bedliner floor 30.

As seen in FIGS. 16 friction pads 82 are also releasable mounted on the tailgate liner 28. The tailgate liner friction pads 82 may also have a preselected configuration, such as the shape of the pads 82 positioned on the bedliner floor 30. The configuration and placement of the friction pads 82 is selective to meet the user's needs in loading and hauling cargo in the bedliner 26.

According to the provisions of the patent statutes, I have explained the principle, preferred construction, and mode of operation of my invention and have illustrated and described what I now consider to represent its best embodiments. However, it should be understood that within the scope of the appended claims the invention may be practiced otherwise than as specifically illustrated and described.

I claim:

1. A bedliner for a vehicle cargo bed having a front wall, a back wall, right and left sides, and a bottom surface, comprising, a non-grip floor fabricated of a polymeric material substantially covering the bottom surface of the cargo bed, said non-grip polymeric material having a coefficient of friction suitable for allowing articles placed on said floor to be easily moved, said floor having right and left edges, a front end, and a back end forming four corners located along said left and right edges adjacent said front and back ends, a plurality of friction strips having a coefficient of friction higher than the coefficient of friction of said non-grip polymeric material for frictionally restraining articles placed on said friction strips, said friction strips being positioned on said floor in preselected positions to form a plurality of grip zones separated from one another and located on said floor to facilitate movement and retention of cargo placed on said floor, and said friction strips being securely connected to said floor.

2. A bedliner for a vehicle cargo bed as set forth in claim 1 which includes, said floor being molded to form a plurality of valleys having a bottom, left side, and right side, said valleys being separated from one another by ribs projecting upwardly from said floor to form a pattern of ribs and valleys on said floor to facilitate water drainage therefrom, said friction strips being formed of a resilient material and mounted on said ribs in said grip zones, and said means for releasably attaching said friction strips to said floor on said ribs in said grip zone.

3. A bedliner for a vehicle cargo bed as set forth in claim 1 in which, said friction strips include pads having a preselected configuration forming the surface area of the respective grip zones, and means extending from a lower surface of each pad for releasably engaging said floor to secure said pads in said grip zone.

4. A bedliner for a vehicle cargo bed as set forth in claim 3 in which, said pads having a generally rectangular configuration corresponding to the rectangular configuration of each of said grip zones, and said pads positioned at said grip zones located adjacent to said four corners of said floor.

5. A bedliner for a vehicle cargo bed as set forth in claim 1 which includes, said grip zones each including a plurality of elongated slots cut in said floor, said slots arranged in a preselected pattern in said grip zone, a resilient protrusion extending from a bottom surface of each friction strip, and said protrusion forming an interference fit with said slot such that said protrusion deforms to allow passage through said slot and once inserted n said slot said protrusion springs back to an original shape to securely retain said friction strip attached to said floor.

6. A bedliner for a vehicle cargo bed as set forth in claim 5 in which, said protrusion includes a resilient arrow-shaped portion connected by a shaft portion to said bottom surface of back friction strip, said arrow-shaped portion being deformable upon insertion into said slot to allow passage through said slot, and said shaft portion having a selected length to permit extension of said arrow-head portion through said slot to insure attachment of said friction strip to said floor.

7. A bedliner for a vehicle cargo bed as set forth in claim 5 in which, said protrusion includes a pair of resilient, spaced apart L-shaped legs extending from said bottom surface of said friction strips, said L-shaped legs being compressed together upon insertion into said slot to allow passage through said slot, and said L-shaped legs springing back to a spaced apart position once inserted in said slot to securely retain said friction strip attached to said floor.

8. A bedliner for a vehicle cargo bed as set forth in claim 1 which includes, said floor being molded to form a plurality of valleys having a bottom surface, left side, and a right side, said valleys being separated from one another by ribs projecting upwardly from said floor to form a pattern of ribs and valleys on said floor to facilitate water drainage therefrom, said friction strips being formed of a resilient material and positioned in said valleys between said ribs in said grip zones, means for releasably attaching said friction strips to said floor within said valleys between said ribs in said grip zones, and said friction strips extending upwardly from said floor in said valleys to a position where upper surfaces of said friction strips are positioned above upper surfaces of said ribs to form said grip zones.

9. A bedliner for a vehicle cargo bed as set forth in claim 1 which includes, said grip zones positioned on said floor adjacent to said corners.

10. A bedliner for a vehicle cargo bed as set forth in claim 9 in which, each grip zone includes a plurality of slots cut in said floor at preselected locations on said floor, said friction strips releasable engageable with said slots to form a preselected pattern of grip zones on said floor, and said grip zone being selectively positioned on said floor to facilitate sliding movement of cargo onto said bed and final positioning of cargo in contact with said grip zones to restrain sliding movement of cargo on said bed.

11. A bedliner for a vehicle cargo bed as set forth in claim 1 which includes, a liner of polymeric material covering a tailgate of the vehicle cargo bed, a plurality of friction strips having a coefficient of friction higher than the coefficient of friction of said liner polymeric material for frictionally restraining articles placed on said strips, said friction strips being positioned on said tailgate liner in preselected positions to form a plurality of grip zones separated from one another and located on said tailgate liner to facilitate movement and retention of cargo placed upon said tailgate liner, and said friction strips being securely connected to said tailgate liner.

12. A bedliner for a vehicle cargo bed as set forth in claim 11 in which, said tailgate liner grip zones include a plurality of slots cut in said liner and arranged in a preselected pattern, and said friction strips releasable engageable in said slots to secure said friction strips at said grip zones to said tailgate liner.

13. A bedliner for a vehicle cargo bed having a front wall, a tailgate, right and left sides, and a bottom surface comprising, a non-grip floor fabricated of a material substantially covering the bottom of the cargo bed, said material being of a slippery nature so that articles placed thereon are easily moved, said floor having left and right edges, a front edge, and a back edge, said floor being molded to form a plurality of parallel spaced valleys, said valleys being separated from one another by parallel spaced ribs projecting upwardly from said floor to form a pattern of ribs and valleys on said floor to facilitate drainage therefrom, a bedliner front wall fabricated of a material substantially covering the front wall of the vehicle cargo bed, said bedliner front wall positioned above said floor front edge, bedliner right and left side walls fabricated of material substantially covering the right and left sides of the vehicle cargo bed, said bedliner right and left side walls positioned above said floor right and left edges, a plurality of friction strips having a coefficient of friction higher than the coefficient of friction of said bedliner material for restraining movement of articles placed on said strips, said friction strips being positioned on said floor in preselected positions to form a plurality of grip zones, said grip zones located on said floor to facilitate movement and retention of cargo placed upon said floor, and attachment means for releasably connecting said friction strips to said floor.

14. A bedliner for a vehicle cargo bed as set forth in claim 13 in which, said floor, said front side wall, and said right and left side walls being formed of a single sheet of polymeric material.

15. A bedliner for a vehicle cargo bed as set forth in claim 13 in which, said friction strips are fabricated of a resilient material, and said friction strips being releasably positioned on upper surfaces of said ribs in said grip zones.

16. A bedliner for a vehicle cargo bed as set forth in claim 13 in which, said friction strips are fabricated of a resilient material, said friction strips being releasably positioned in said valleys between said ribs, and said friction strips extend above upper surface of said ribs to form non-slip surfaces in said grip zones.

17. A bedliner for a vehicle cargo bed as set forth in claim 13 in which, said attachment means include a resilient protrusion extending from a bottom surface of each friction strip, said protrusion being deformable upon compression to move between an initial position and a compressed position and return to said initial position upon release of the compression, said grip zones each including a plurality of elongated slots cut in said floor, said slots arranged in a preselected patter in said grip zones, and said protrusions of said friction strips forming an interference fit with said slots such that said protrusions deform upon compression to allow passage through said slots and after insertion in said slots said protrusion return o the initial position to securely retain said friction strips attached to said floor.

18. A bedliner for a vehicle cargo bed as set forth in claim 17 which includes, a plurality of slots cut in upper surfaces of said ribs on said floor, and said friction strip protrusion releasably engageable in said slots to connect said friction strips in a preselected pattern to said floor to form said grip zones.

19. A bedliner for a vehicle cargo bed as set forth in claim 18 which includes, a plurality of non-grip friction strips having said protrusions, said non-grip friction strips being fabricated of a material of a slippery nature corresponding to said material forming said non-grip floor, and said non-grip friction strips releasably engageable in selected ones of said slots to connect said non-grip friction strips in a preselected pattern to said floor to form non-grip zones in combination with said grip zones.

20. A bedliner for a vehicle cargo bed as set forth in claim 17 which includes, a plurality of slots cut in said valleys between said ribs on said floor, and said friction strip protrusions releasably engageable in said slots to connect said friction strips in a preselected pattern to said floor and extend above said ribs to form said grip zones.

21. A bedliner for a vehicle cargo bed as set forth in claim 13 which includes, a non-grip tailgate section fabricated of a material of a slippery nature and substantially covering the tailgate of the cargo bed, said friction strips being releasably engageable with said non-grip tailgate section to form a plurality of selectively positioned grip zones, and said grip zones being located on said non-grip tailgate section to facilitate ease of movement and retention of articles positioned on the tailgate.

22. A method for loading cargo onto a bedliner of a vehicle cargo bed comprising the steps of, positioning cargo on a bedliner floor having a coefficient of friction permitting articles placed on the floor to move easily, sliding the cargo along the floor to an area adjacent a desired location on the floor, positioning at the desired location on the floor a grip zone having a coefficient of friction greater than the coefficient of friction of the remainder of the floor to restrain articles positioned on the grip zone from moving freely thereon, and moving the cargo positioned on the bedliner floor onto the grip zone to restrain undesired movement of the cargo on the bedliner floor.

23. A method as set forth in claim 22 which includes, locating grip zones at four corners of the bedliner floor.

24. A method as set forth in claim 22 which includes, positioning a grip zone at a preselected location on a bedliner section attached to a tailgate of the vehicle cargo bed, sliding cargo on the tailgate bedliner section, and moving the cargo positioned on the bedliner tailgate section onto the grip zone to restrain undesired movement of the cargo on the bedliner tailgate section.

25. A bedliner for a vehicle cargo bed having a front wall, a tailgate, right and left sides, and a bottom surface comprising, a floor fabricated of polymeric material substantially covering the bottom surface of the cargo bed, said polymeric material having a coefficient of friction permitting articles placed on said floor to move easily, said floor being molded to form a plurality of ribs, each of said ribs having an upper surface, a plurality of valleys formed in said floor between said ribs, said ribs and valleys being positioned to promote drainage of water from said floor, a plurality of selected adjacent ribs positioned at a preselected location on said floor where sliding movement of cargo on said floor is to be restrained, said selected adjacent ribs having slots cut in said upper surfaces, a plurality of friction strips releasably engageable in said slots of said selected adjacent ribs, said friction strips having a coefficient of friction higher than the coefficient of friction of the polymeric material forming said floor, said friction strips each having a bottom edge position releasably engageable in said slots to position said friction strips on said upper surfaces of said selected adjacent ribs, a plurality of non-grip strips releasably inserted in said slots of said selected adjacent ribs, said non-grip strips having a coefficient of friction substantially identical to the coefficient of friction of the polymeric material forming said floor to facilitate sliding movement of cargo on said selected adjacent ribs, and said non-grip strips replacing said friction strips on said selected adjacent ribs to allow unrestrained sliding movement of the cargo on said selected adjacent ribs.

* * * * *